May 22, 1923. 1,456,248
C. L. MOYER
MACHINE FOR FORMING BOX BLANKS
Filed April 29, 1921 7 Sheets-Sheet 1
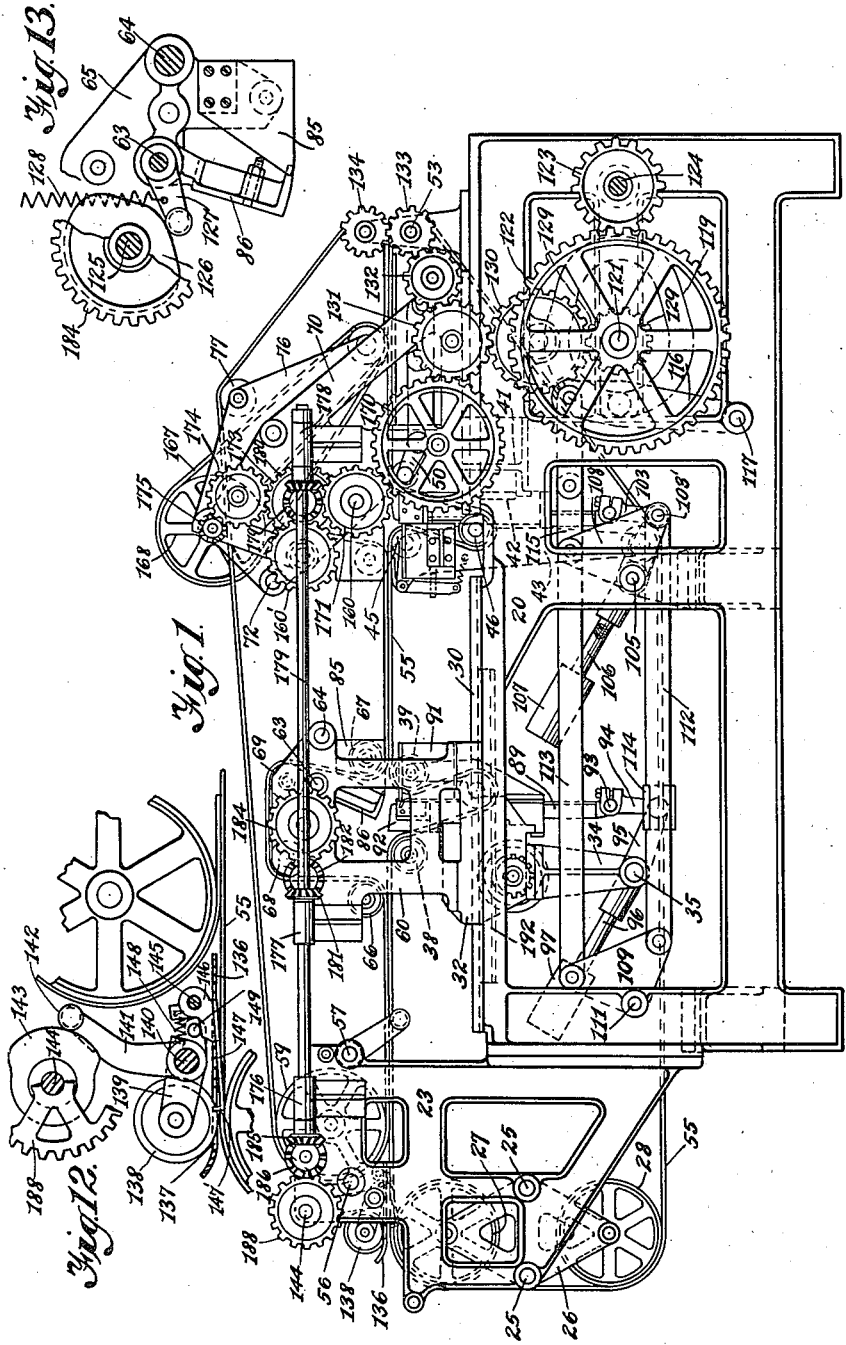
INVENTOR,
Charles L. Moyer,
BY Samuel N. Pond,
ATTORNEY

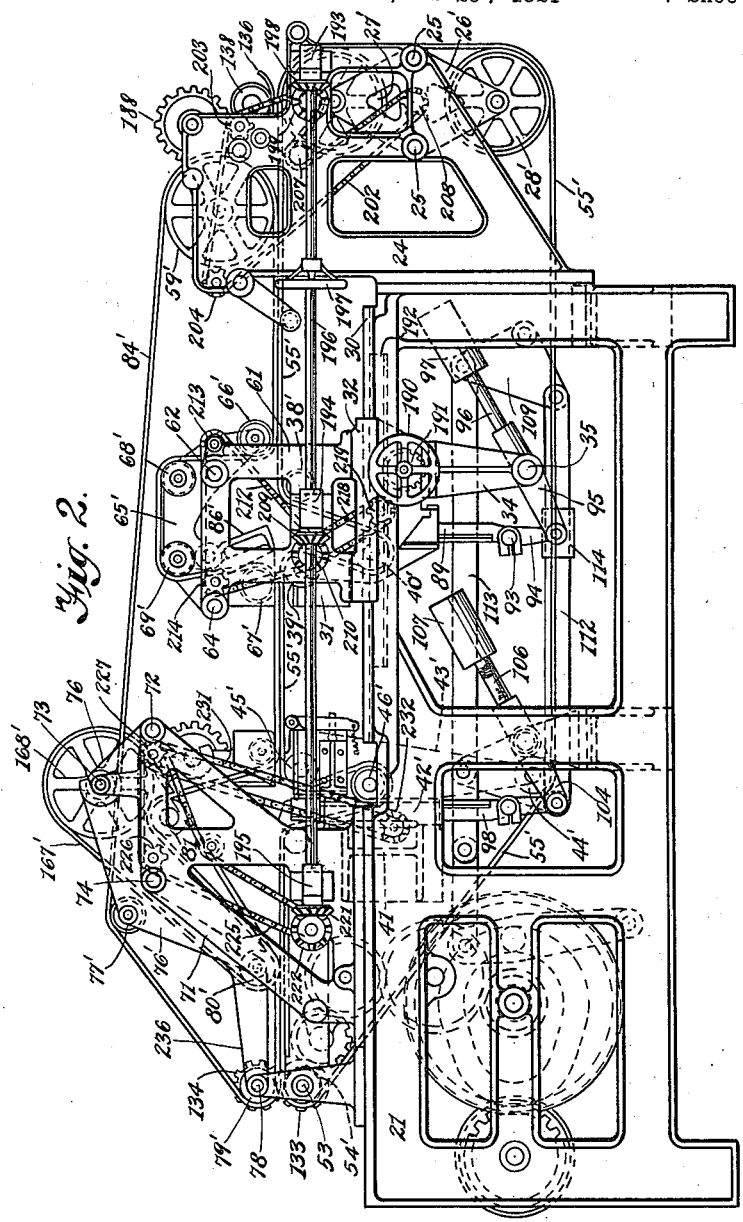

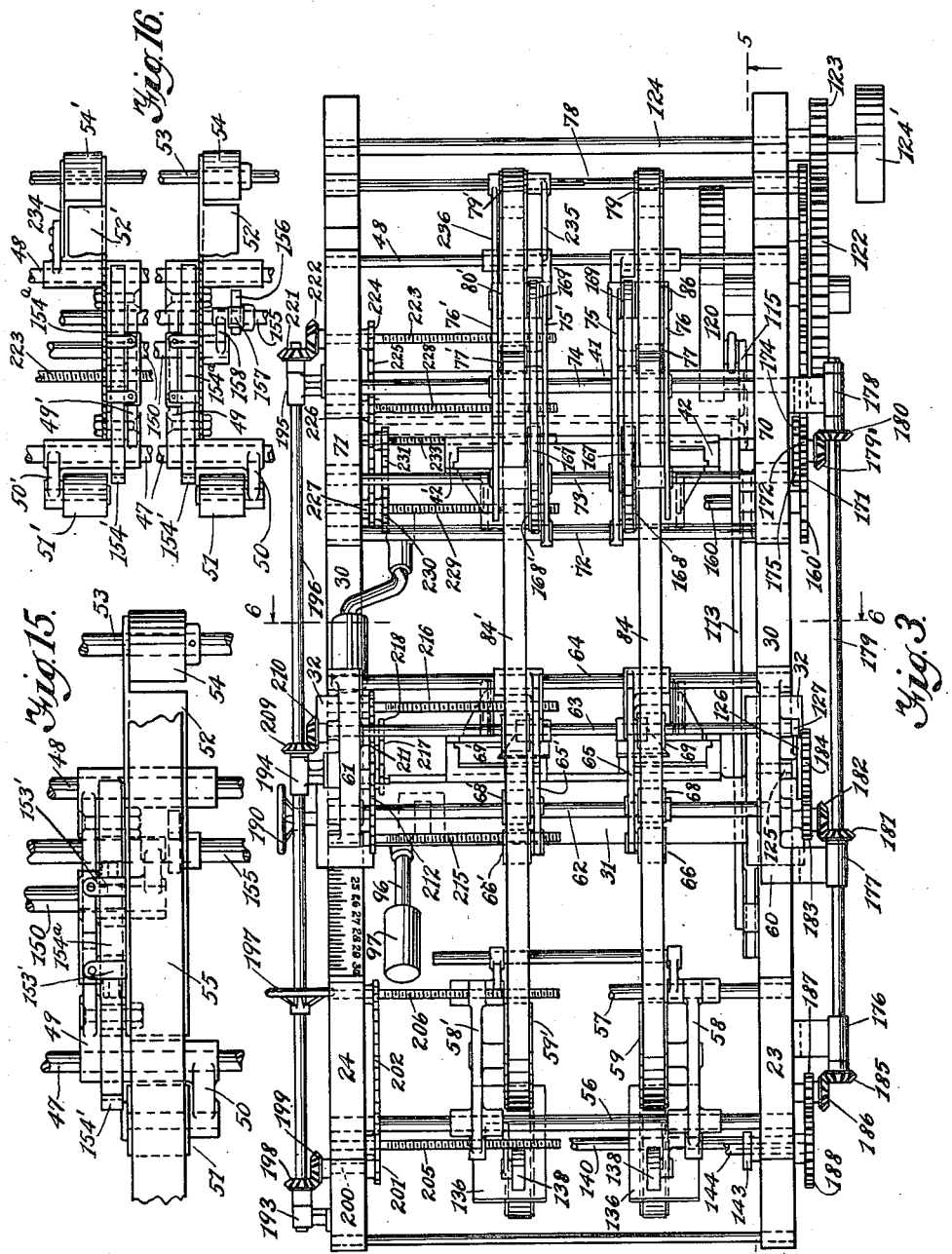

May 22, 1923.
C. L. MOYER
1,456,248
MACHINE FOR FORMING BOX BLANKS
Filed April 29, 1921
7 Sheets-Sheet 4
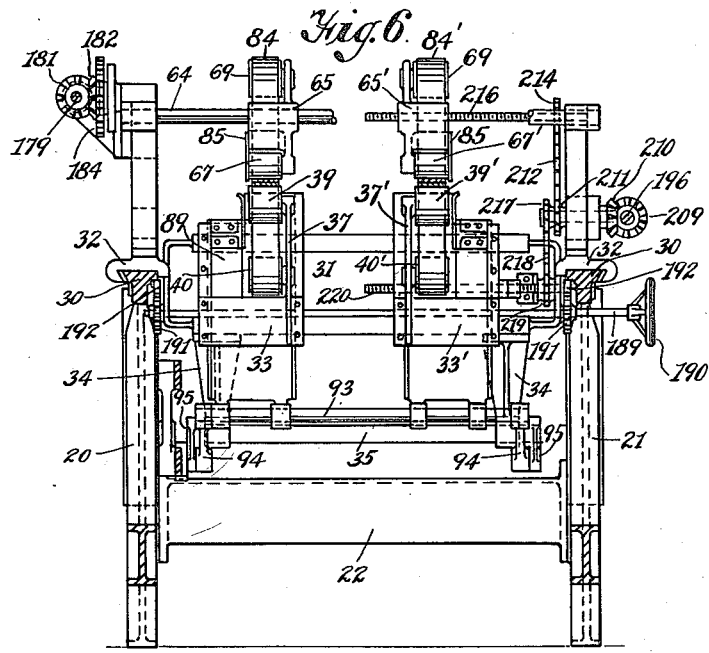
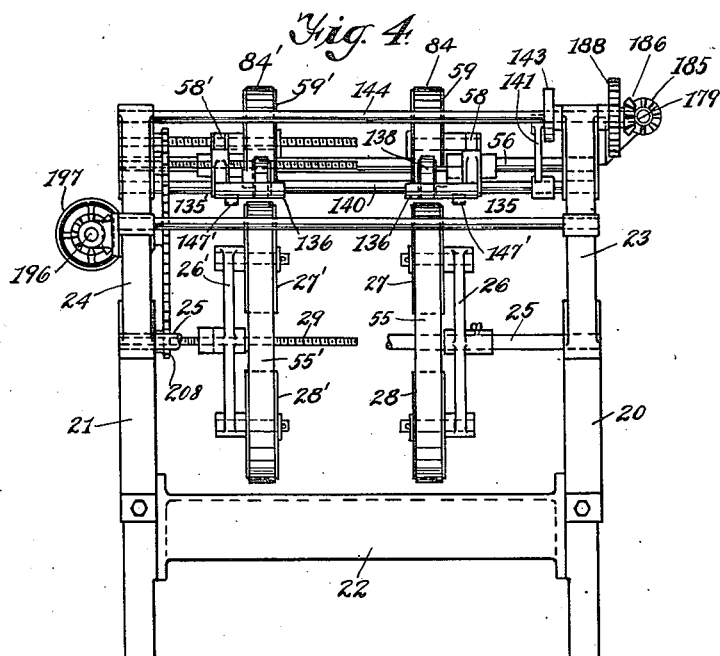
INVENTOR,
Charles L. Moyer,
BY Samuel N. Pond,
ATTORNEY

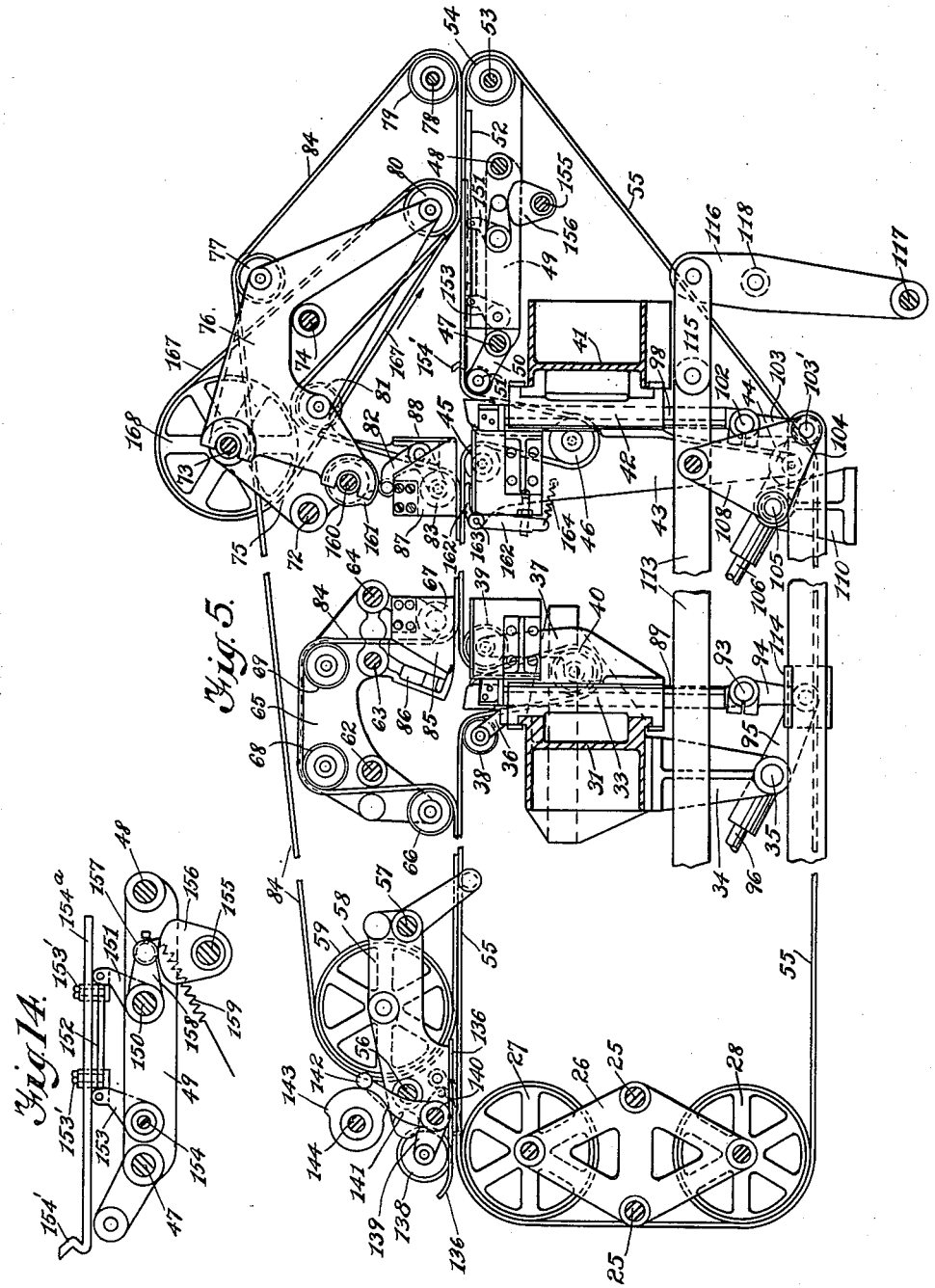

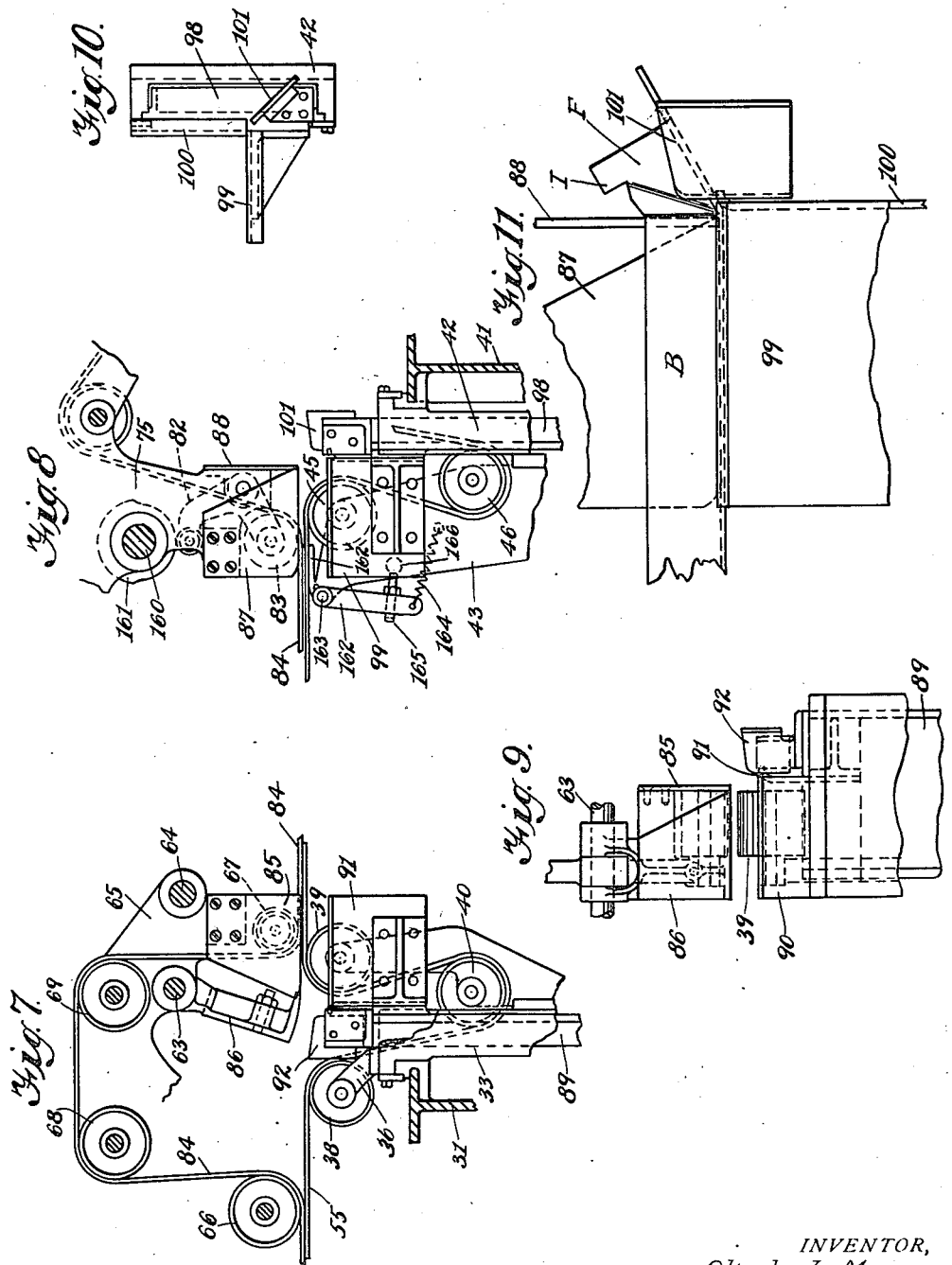

May 22, 1923.
C. L. MOYER
1,456,248
MACHINE FOR FORMING BOX BLANKS
Filed April 29, 1921
7 Sheets-Sheet 7
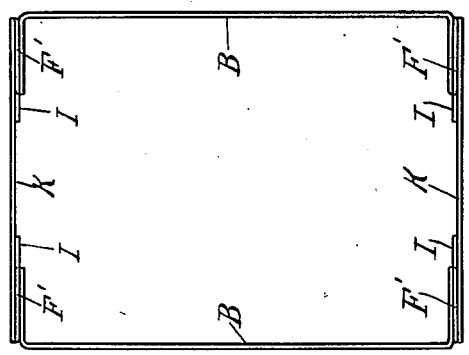
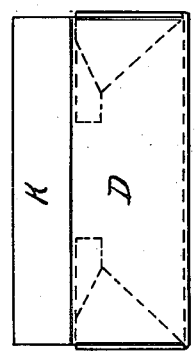
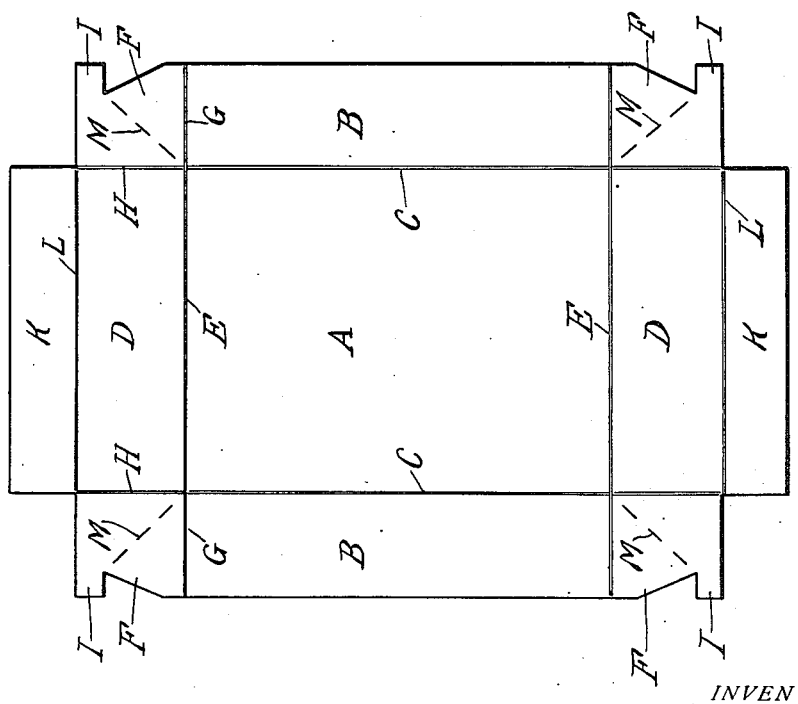
INVENTOR,
Charles L. Moyer,
BY Samuel N. Pond,
ATTORNEY Patented May 22, 1923.

1,456,248

UNITED STATES PATENT OFFICE.

CHARLES L. MOYER, OF CHICAGO, ILLINOIS, ASSIGNOR TO MORRIS PAPER MILLS, OF CHICAGO, ILLINOIS, A CORPORATION OF ILLINOIS.

MACHINE FOR FORMING BOX BLANKS.

Application filed April 29, 1921. Serial No. 465,433.

*To all whom it may concern:*

Be it known that I, CHARLES L. MOYER, a citizen of the United States, residing at Chicago, in the county of Cook and State of Illinois, have invented certain new and useful Improvements in Machines for Forming Box Blanks, of which the following is a specification.

This invention relates to machines for forming cardboard blanks used in the manufacture of cardboard boxes and cartons, such as are extensively used by merchants for the packaging of suits, clothing and dress goods and similar articles, such boxes usually comprising a body formed with upwardly bent sides and end walls interlocked or stitched at the corners, and a lid or cover of similar shape and structure made sufficiently larger to fit down over the body.

The bodies and covers of such boxes are commonly made from a rectangular sheet of stiff paste board or cardboard that is preliminarily scored longitudinally and crosswise along the lines on which the side and end walls are bent up; and the machine of my present invention is designed to receive such prepared blanks, and has for its main function to break or bend the corners of the blank obliquely, so that as the side and end walls are turned upwardly, the rectangular corner pieces at the end of the side and end walls may be readily folded obliquely on themselves, thus forming a double walled flap which lies snugly against the inner side of either the side or end wall, usually the latter, and is either stitched or interlocked by tongues and slits to the latter. A further object or purpose of the present invention is to provide a machine for thus breaking or bending the corners of the blank which, by a simple adjustment of certain of the corner forming dies and the blank feeding mechanism, shall be capable of handling blanks of varying lengths and widths.

Other more specific objects and advantages of the invention will be apparent to those skilled in the art as the same becomes better understood by reference to the following detailed description, taken in connection with the accompanying drawings, in which I have illustrated one practical embodiment of the invention which has been found to satisfactorily effectuate the purpose thereof, and wherein—

Fig. 1 is a side elevation of the machine;

Fig. 2 is a side elevation viewed from the side opposite that shown in Fig. 1;

Fig. 3 is a top plan view, looking down on Fig. 1;

Fig. 4 is an end elevation, viewed from the receiving end of the machine, which is the left hand end of Figs. 1 and 3;

Fig. 5 is a longitudinal section substantially on the line 5—5 of Fig. 3, slightly enlarged and broken out between its ends; and with the left side frame omitted for clearness;

Fig. 6 is a vertical transverse section, taken on the line 6—6 of Fig. 3;

Fig. 7 is an enlarged detail view in vertical longitudinal section, illustrating the upper and lower die members that break one of the rear corners of the blank;

Fig. 8 is a view similar to Fig. 7, showing the upper and lower die members that break one of the front corners of the blank;

Fig. 9 is a detail view in elevation showing the die members of Fig. 7 as viewed from the left of the latter figure;

Fig. 10 is a top plan view of the lower die member shown in Fig. 8;

Fig. 11 is a fragmentary elevation of an enlarged scale, showing the die members of Fig. 8, engaged with a blank and breaking the corner of the latter;

Fig. 12 is an enlarged detail view of an automatic device for controlling the admission of a blank to the conveyor belts of the machine;

Fig. 13 is a detail view, showing the mechanism for actuating a swinging element of the upper die which breaks one of the rear corners of the blank;

Fig. 14 is a detail view, illustrating a blank arresting device which arrests the travel of the blank after it has entered the field of action of the dies;

Fig. 15 is an enlarged top plan view of one side of the blank arresting mechanism;

Fig. 16 is a top plan view, partly in section and broken out, of the blank arresting mechanism;

Fig. 17 is a top plan view of a cut and scored blank, such as is operated upon by the machine;

Fig. 18 is a top plan view of the same blank in full folded position; and

Fig. 19 is an end view of the folded box shown in Fig. 17.

I will first briefly outline the general plan and organization of the machine, and will then describe the same more in detail by reference to the drawings. The blanks are carried through the machine between the contiguous laps of two pairs of endless belts, each pair comprising an upper belt and a lower belt. In order to adapt the belts to handle blanks of varying widths, one pair of belts, with their supporting, guiding and actuating devices are so mounted as to be bodily shiftable laterally relatively to the other pair. About midway of the length of the machine, the lower laps of the upper belts are upwardly offset, and the upper laps of the lower belts are downwardly offset, to provide room for a die mechanism by which the side and end walls of the blank are bent up, and the corner portions are broken and folded obliquely. This die mechanism comprises four upper male die members which operate on the four corner portions of the blank and are stationary in the operation of the machine, except that the two foremost members have hinged walls which swing upwardly and outwardly to permit the front end of the blank to pass freely beneath them without interference, and four lower female die members which cooperate with the male die members and reciprocate vertically. The foremost pairs of cooperating die members, together with the pulleys which guide the offset portions of the belts, are carried by a carriage which is mounted on and adjustable lengthwise of the main frame, so as to vary the length of the die mechanism to handle blanks of varying lengths, and the two pairs of die members on one side of the machine are so mounted as to be shiftable laterally relatively to the two pairs on the other side so as to vary the width of the die mechanism to handle blanks of varying widths.

At the entrance end of the machine is an automatic mechanism for controlling the admission of the successive blanks into the nip of the carrier belts. The pairs of belts between the forward and rear die members are automatically controlled by a mechanism which releases the grip of the belts on the blank during the instant that the dies are operating on the latter, and just beyond the die members is an automatic stop which engages with the forward end of the blank as it reaches a position to be operated upon by the dies, and as soon as the bending or breaking operation is completed, is retracted to permit the blank to pass on again into the grip of the belts and be delivered from the machine. Cooperating with the main carrier belt are a pair of rapidly driven auxiliary belts which operate to throw the upwardly bent forward wall of the blank down into the feed of the delivery portions of the main belts.

Coming now to a more detailed description of the complete machine, 20 and 21 designate a pair of generally rectangular vertical parallel side frame members rigidly connected and spaced near their lower ends by heavy cross-beams 22 (Figs. 4 and 6) and by numerous tie rods hereinafter referred to, most of which form supports for various operating parts of the machine. At the receiving end of the machine and attached to the forward end of the main side frames 20 and 21 are a pair of auxiliary side frame members 23 and 24 which extend upwardly some distance above the tops of the main frames 20 and 21, and are rigidly connected and spaced by rods hereinafter referred to.

Extending between and connecting the frames 23 and 24 are a pair of parallel rods 25, on which are mounted a pair of diamond-shaped yokes 26 and 26' (Figs. 1, 2 and 4) in the upper ends of which are journaled belt pulleys 27 and 27' and in the lower ends of which are journaled similar belt pulleys 28 and 28'. The frame 26 is fixed on the shafts 25, while the frame 26' is adjustable on said shafts toward and from the frame 26 by means of a long screw 29 (Fig. 4) which extends through the frame 26'.

On a portion of the upper edges of the main side frames 20 and 21 are formed a pair of dove-tailed rails 30 (Fig. 6), slidably mounted on which is a carriage carrying the lower and upper adjustable belt supports and guides and also the forward pairs of die members. This carriage, as to its main structural features, includes a relatively heavy transversely disposed casting 31, the ends 32 of which are formed with dove-tailed channels on their under sides to slidably engage with the rails 30. On the inner face of the casting 31 are mounted a pair of built up blocks 33 and 33' (Fig. 6), the former being fixedly attached to the casting 31 and the latter being slidably mounted thereon. Depending from the casting 31 are a pair of legs 34 in the lower ends of which is journaled a rock-shaft 35.

Journaled on upstanding arms 36 and 37 on the block 33 are a pair of rollers 38 and 39, and a downwardly offset roller 40 is journaled on the lower portion of the arm 37. The block 33' is similarly equipped with a group of three rollers 38', 39' and 40', similar in location to the rollers 38, 39 and 40. Further along toward the rear end of the machine is a heavy stationary casting 41 (Fig. 5), generally similar to the casting 31 and permanently joined to and connecting the main side frames 20 and 21. On the inner face of the casting 41 are mounted a pair of blocks 42 and 42' structurally similar to the blocks 33 and 33' shown in Fig. 6, the block 42 being rigidly attached to the casting 41 and the block 42' being slidably mounted on the casting 41. Rigid with and depending from the blocks 42 and 42' are legs 43 and 43', in the lower ends of which are journaled rollers 44 and 44'. At the upper end of the legs 43 and 43' are journaled belt rollers 45, 45', and downwardly offset therefrom are journaled other belt rollers 46, 46'.

Extending between the main side frame members are a pair of rods 47 and 48 (Figs. 5 and 16) mounted on and between which are a pair of yoke bars 49, 49', the bar 49 being fixed and the bar 49' being slidable laterally on said rods. Rigid with the forward sleeve bearings of the bars 49, 49' are arms 50, 50' carrying rollers 51 and 51', respectively; and also attached to the bars 49 and 49' are angle bars 52, 52'. At the rear end of the machine frame is a transverse shaft 53, on which are a pair of belt driving pulleys 54 and 54', the pulley 54 being keyed to the shaft, and the pulley 54' being splined thereon.

Trained over and guided and supported by the several pulleys and rollers above described and located are a pair of lower conveyor belts 55 and 55', and it will here be noted that all the supporting and guiding devices of the belt 55' are shiftable laterally relatively to the guiding and supporting devices of the belt 55, so that the distance between said belts can be varied to handle blanks of varying widths.

Cooperating with these two lower belts are a pair of upper belts located in the same vertical planes as the lower belts, and the supporting, guiding and driving devices of these upper belts will next be described.

Supported on and between the upper portion of the extension frames 23 and 24 are a pair of parallel rods 56 and 57, on which are mounted yokes 58, 58' the former being fixed on said rods and the latter slidable thereon. Journaled on the yokes 58 and 58' are pulleys 59, 59'.

The longitudinally adjustable carriage herein before referred to as slidably mounted on the rails 30, includes a pair of side frame members 60 and 61 rigidly spaced and connected by three parallel rods 62, 63 and 64. Mounted on these rods are fixed and slidable yokes 65, 65'. On the lower ends of the yoke 65 are journaled rollers 66, 67, and above and vertically offset from these rollers are additional rollers 68, 69. Journaled on the yoke 65' are similar rollers 66', 67' 68' and 69'.

Mounted on the upper edges of the main side frames 20 and 21 toward the rear end of the machine are a pair of skeleton frame members 70 and 71 rigidly connected and spaced by parallel tie rods 72, 73, and 74 (Fig. 3). On these tie rods are mounted a pair of yokes 75, 75', and on the outer sides of and parallel with said yokes are a pair of auxiliary yokes 76, 76'. Journaled in and between the yokes 75 and 76 is a roller 77, and journaled in and between the yokes 75' and 76' is a corresponding roller 77'. Journaled above and parallel with the shaft 53 is a shaft 78, having thereon a pair of driving pulleys 79 and 79'; the pulley 79 being keyed to the shaft and the pulley 79' splined thereon. Journaled in and between the lower ends of the yokes 76 and 75 is a pulley 80, and similarly journaled in and between the lower ends of the yokes 76' and 75' is a corresponding pulley 80'. Journaled in and between the yokes 76 and 75 is an upwardly offset pulley 81, and similarly journaled in and between the yokes 76' and 75' is an upwardly offset pulley 81'. On the lower depending limbs of the yokes 75 and 75' are pivoted elbow levers such as are shown at 82 in Figs. 5 and 8, the arms of said levers carrying rollers 83.

Trained over the guiding, supporting and driving pulleys last described are a pair of upper endless belts 84, 84' the lower laps of which lie contiguous with the upper laps of the lower belts 55 and 55' except for the vertically offset portions of said lower and upper belts, the purpose of thus offsetting the belts at these points being to accommodate the operation of the die mechanism.

Referring next to this die mechanism, which is best illustrated in the sectional views (Figs. 5 and 6) and the detail views Figs. 7 to 11 inclusive, the rear lower limbs of the yokes 65 and 65' have attached thereto on their outer sides plates 85 forming the outer sides of a pair of stationary die members. Hinged on the rod 63 are a pair of swinging shoes 86 which constitute the front walls of said die members. Similarly, on the depending inner limbs of the yokes 75 and 75' are attached side and rear die plates 87 and 88, respectively, which together form the rear pair of stationary die members. It will be observed that the adjacent edges of the die plates 85 and swinging shoes 86 are oblique, diverging from their lower to their upper edges; and the same is true of the rear die plates 87 and 88. This provides a space in the upper die members for the corner of the blank which is broken and folded by the lower die members.

The lower cooperating die members are vertically reciprocable. In the blocks 33 and 33' are vertical slideways in which are mounted slides 89. Attached to and extending upwardly from the upper ends of the slides 89 are front and side die plates 90 and 91, respectively, and mounted on the upper ends of the slides 89 outside of and obliquely to the corner formed by the die plates 90 and 91, is an upstanding die blade 92, the function of which is to break and fold one of the rear corners of the blank.

The lower ends of the slides 89 are sleeved on a horizontal rod 93 best shown in Fig. 6, and this rod in turn is mounted in the upper ends of a pair of links 94, said links being pivoted at their lower ends to a pair of arms 95, these latter being fast on the rock-shaft 35, that is journaled in the lower ends of the brackets 34. Fast on the rock-shaft 35 is an arm 96 extending oppositely to the arms 95 and carrying a counter weight 97 designed to substantially neutralize the gravity effect of the reciprocating die members.

The two reciprocating die members which operate upon the forward or advance corners of the blank are substantially like those last described, each consisting of a vertical slide 98 mounted in the blocks 42 and 42', and having attached to its upper end side and end die plates 99 and 100 respectively, and an oblique die blade 101 similar in structure and function to the die blade 92. The lower ends of the slides 98 are sleeved on a connecting rod 102 similar to the rod 93 which rod is mounted on links 103 similar to the links 94, the links 103 being pivoted on a cross rod 103' in turn carried by arms 104 similar to the arms 95, and the arms 104 being fast on a rock-shaft 105, on which latter is a rearwardly extending arm 106 carrying a counter weight 107. The means for reciprocating the lower die members further comprises a pair of triangle levers 108 and 109, best shown in Fig. 1, lever 108 being pivoted at one corner on rock-shaft 105 journaled in a bracket 110 and lever 109 being fulcrumed on side frame member 20 at 111. Said levers are connected at their lower corners by a bar 113 parallel with the bar 112. The lower corner of the triangle lever 108 is pivotally jointed to the rod 103', while the lower end of one of the links 94 carries a shoe 114 that is slidably mounted on the bar 112. The rear end of the upper connecting bar 113 of the triangle levers is connected by a link 115 to the upper end of a lever 116 that is pivoted at 117 to the lower portion of the frame member 20. On the lever 116 is a roller 118 that rides in the cam groove 119 formed in a cam disc 120, this latter being fast on a shaft 121, journaled on the side frame member 20 and carrying a large gear 122, driven from a pinion 123 fast on the main drive shaft 124, of the machine, this latter carrying a pulley 124' that is belted to any suitable source of power.

Referring once more to the upper stationary die members, the purpose of the swinging die walls or shoes 86 of the pair nearest the front end of the machine is to allow the advance end of the blank to readily enter the field of operation of the dies without interference on account of the advance end of the blank bending or springing upwardly as it approaches the dies. Fig. 13 illustrates in detail a spring and cam actuated mechanism for controlling the movement of the hinged die plates 86. On a cam shaft 125 is mounted a cam 126 acting upon an arm 127 which is rigid with the swinging wall or shoe 86. A spring 128 pulls the shoe upwardly, while the cam 126 forces it downwardly to vertical position just after the blank has reached a position to be operated on and just before the lower reciprocating die members rise on their working stroke.

The two series of belts are positively driven from the shaft 121 through a train of gears 129, 130, 131, 132, 133 and 134 all clearly shown in Fig. 1.

At the blank receiving end of the machine are located a pair of automatic devices for controlling the passage of the blanks into the machine in properly timed succession, this mechanism being most clearly shown in the detail view Fig. 12, and in the end elevation view Fig. 4. These automatic devices are designated as entireties by 135 and 135' (Fig. 4) and as they are structurally identical, a description of one will suffice for both. To the lower front surface of the yokes 58 and 58' are secured flat plates 136 having upwardly turned forward ends lying just above the lower conveyor belts 55 and 55'. This plate has a slot 137 through which extends the lower periphery of a friction feed roller 138 journaled in an arm 139 that is fast on a rock-shaft 140 mounted in and between the frame members 23 and 24. On one end of this rock-shaft is an upstanding arm 141 carrying at its upper end a roller 142 engaged with a cam 143 fast on a cam shaft 144. Also mounted on a pivot stud 145 in each of the yokes 58 and 58' is a block 146 lying just outside the upper lap of the lower feed belt, said block 146 having attached thereto a stop finger 147 with an upturned end 147'. Between the upper side of the block 146 and the hub of the roller arm 139 is interposed a compression spring 148. On a rearward extension of the arm 139 is a pin 149 that operates on the upper edge of the block 146 in front of the pivot of the latter.

With the parts in the position shown in Fig. 12 the cam 143 has raised roller 138 out of blank feeding position, and the pin 149 acting on the block 146 has depressed the stop finger 147 so that its bent end 147' closes the passage between the conveyor belt and the plate 136. This happens immediately after each blank has passed into the receiving end of the machine. At the proper interval of time when the machine is ready to handle another blank, the cam 143 releases the roller 138 and permits it to drop into frictional engagement with the lower conveyor belt, and at the same time the pin 149 is raised and the spring 148 throws the stop fingers 147 upwardly to clear the throat of the machine and allow the next blank to enter. By means of this automatic mechanism the blanks are allowed to enter the machine only as fast as they are handled by the die mechanism, thus avoiding clogging of the machine, and rendering it unnecessary to depend upon the judgment and skill of the operative to avoid overcrowding of the machine.

Just beyond the die mechanism is located an automatic mechanism for arresting the blank the instant it has reached a position between the dies to be operated on by the latter, which mechanism is best shown in the detail views, Figs. 14, 15 and 16, and, like the feed control mechanism, comprises a pair of duplicate assemblies, one of which is fixed and is associated with the fixed conveyor belts, while the other is laterally adjustable and is associated with the laterally adjustable conveyor belts. Extending between the yokes or bars 49 and 49' is a rock-shaft 150 fast on which is an upstanding arm 151 pivotally connected at its upper end to a strip 152, the other end of said strip being similarly connected to a companion arm 153 pivoted on a stud 154 carried by each of the yokes 49 and 49'. On the strip 152 is adjustably mounted by means of clamps 153' a strip 154ᵃ which, as shown in Fig. 16, lies just inwardly of the upper lap of each of the lower conveyor belts just in rear of the die mechanism. On the inner end of the strip 154ᵃ is an upstanding angularly bent stop finger 154' which, when the strip 154ᵃ is in the raised position shown in Figs. 5 and 14, lies directly across the path of travel of the blank. Extending between the main side frame members is a cam shaft 155 (Fig. 5) carrying a cam 156 that cooperates with a roller 157 on an arm 158 keyed to the shaft 150. Also connected to the arm 158 is a pull spring 159 by which the roller 157 is held in engagement with the cam 156. By the last described mechanism the stop fingers 154' are alternately raised and lowered above and below the plane of the lower conveyor belt, said fingers rising to operative position the instant a formed blank has passed on beyond them and arresting the travel of the next blank for the instant required to form the same by the dies, and then withdrawing below the plane of the belt to allow the blank to pass on and out of the machine.

Cooperating with the stop mechanism last described, is a belt controlling mechanism located and operating between the front and rear pairs of dies which intermits the grip of the belts on the blank the instant the latter is positioned and arrested, and immediately after the lower breaking dies have withdrawn restores the grip of the belts on the blank so as to carry the latter out from between the dies. This mechanism also comprises two groups of identical devices, one group operating upon the fixed pair of belts and the other group operating upon the laterally adjustable pair of belts, and as these groups are identical a description of one will suffice for both.

Referring to Figs. 5 and 8 in which this mechanism is most clearly shown, and a part of which has already been described, 160 designates a cam shaft journaled in and between the side frames 70 and 71, fast on which is a cam 161 that during every alternate half revolution of the shaft 160 depresses the belt guide roller 83 by acting on the elbow lever 82, thereby forcing the upper of the two blank carrying belts downwardly toward the lower belt. Cooperating with the roller 83 and acting on the lower belt is an elbow lever 162 pivoted at 163 to an upper corner of the stationary casting 43 and having a horizontal arm 162' that is pressed upwardly against the lower side of the lower belt by a pull spring 164, the extent of this upward thrust being controlled by a regulating pin 165 cooperating with a stop 166 on the block 43. The parts are so timed that when the blank is first received and arrested by the stop fingers 154', and while the dies are operating thereon, the cam 161 is making the idle portion of its travel, at which time the grip of the belts between the front and rear pairs of die members is just sufficient to carry the blank up to the stop fingers 154' the belts thereafter and during the forming operation slipping over the blank. The instant the operation is performed and the stop fingers withdrawn, the cams 161 cause the rollers 83 (in cooperation with the underlying levers 162) to pinch the belts on the blank and thereby carry the latter on beyond the dies and again into the grip of the belts.

As the blank emerges from the die mechanism, its forward end wall, which has been bent upwardly by the transverse walls of the reciprocating die members, stands at an upwardly inclined angle; and in order to throw this wall down again into the horizontal plane of the conveyor belts I employ an auxiliary rapidly driven pair of belts 167, 167'. As shown in the plan view, Fig. 3, these auxiliary belts lie just inwardly of the vertical planes of the main belts, and are mounted at their upper ends on pulleys 168, 168' fast on the shaft 73, and at their lower ends are trained around pulleys 169, 169' (Fig. 3) loosely journaled on the shafts of the main belt guide pulleys 80, 80' alongside of the latter. These auxiliary belts 167, 167' are driven in the direction indicated by the arrow in Fig. 5 at a high rate of speed, and as the lower laps of these belts strike the upstanding forward edge of the blank they draw it down into the nip of the main belts, by which latter the blank is passed out of the delivery end of the machine, or into additional mechanism for completing the folding and setting up of the blank, such mechanism not being herein shown. The drive shaft 73 of this auxiliary belt mechanism is driven from the intermediate gear 131, (Figs. 1 and 3) by a train of gears 170, 171, 172 (Fig. 3) 173, 174 and 175.

The cam shaft 144 which opens the feed controlling mechanism at the entrance end of the machine, the cam shaft 125 which operates the swinging walls 86, 86' of the front pair of upper die members, and the cam shaft 160 which actuates the belt gripping levers 82 are all driven by mechanism best shown in Figs. 1 and 3 and comprising the following parts. The last-mentioned cam shaft 160 is driven by a gear 160' in mesh with the intermediate gear 172, already mentioned as one of the train of gears through which the auxiliary belts 167 and 167' are driven. Horizontally journaled in bearing brackets 176, 177 and 178 is a shaft 179. Fast with the hub of the intermediate gear 172 (Fig. 3) is a mitre gear 179' which drives a mitre gear 180 keyed on the shaft 179. Splined on the shaft 179 is a mitre gear 181 which drives a mitre gear 182 journaled in the frame member 60, and fast-with the mitre gear 182 is a pinion 183 which drives a gear 184 fast on the cam shaft 125. On the forward end of the shaft 179 is a mitre gear 185 which drives a mitre gear 186 journaled in the frame member 23, and fast with the mitre gear 186 is a pinion 187 which drives a gear 188 fast on the cam shaft 144.

The carriage hereinabove described is slidable lengthwise of the machine on the rails 30 and is manually shiftable by means of a cross-shaft 189 (Fig. 6) journaled in the carriage and carrying on one end thereof a hand wheel 190. Fast on the shaft 189 are pinions 191 which mesh with racks 192 on the side frames.

It now remains to describe the mechanism by which the conveyor belts and their guiding, supporting and driving devices on one side of the machine, and one pair of front and rear dies on the same side are bodily shiftable laterally of the machine in order to make the latter adaptable to blanks of varying widths. On the left side of the machine, viewing it from the front, is journaled in bearing brackets 193, 194 and 195, a horizontal shaft 196, fast on which is a hand wheel 197. Keyed on the forward end of the shaft 196 is a mitre gear 198 driving a mitre gear 199 on a stub shaft 200 journaled in the frame member 24. On the inner end of the stub shaft 200 is a sprocket wheel 201 driving a sprocket chain 202. This chain passes over sprockets 203, 204 fast on long screws 205 and 206, respectively (Fig. 3) that are journaled in the side frame member 24 and extend through tapped holes in the yoke 58'. The same sprocket chain 202 extends over an idler roller 207 (Fig. 2) and then down and around a sprocket 208 fast on the long screw 29 (Fig. 4) which is threaded through the lower yoke member 26'.

Splined on the shaft 196 is an intermediate mitre gear 209 that drives a mitre gear 210 journaled in the side frame member 61. Fast on the shaft of the mitre gear 210 is a sprocket wheel 211 (Fig. 6) engaged with a sprocket chain 212 that passes upwardly over a pair of sprockets 213 and 214 journaled in the upper portion of the frame 61 and fast on a pair of long screws 215 and 216, respectively, that are engaged with tapped holes in the laterally adjustable yoke 65'. Also fast on the shaft of the mitre gear 210 is a sprocket 217 (Fig. 6) driving a sprocket chain 218 which passes downwardly around a sprocket 219 that is fast on a long screw 220, (Fig. 6) that engages a tapped hole in the laterally shiftable die supporting block 33'. On the rear end of shaft 196 is a mitre gear 221 driving a mitre gear 222 fast on a long screw 223 that is threaded through the yoke bar 49' (Fig. 16) carrying the shiftable half of the blank arresting mechanism and the belt guiding pulley 51'. A sprocket wheel 224 on the screw 223 drives a sprocket chain 225 which, as shown in Figs. 2 and 3, extends upwardly and over a pair of sprockets 226 and 227 fast on long screws 228 and 229, respectively, that are threaded through the adjustable yoke plates 75' and 76'. Fast on the screw 229 is a sprocket 230 from which a chain 231 extends downwardly to and around a sprocket 232 (Fig. 2) that is fast on a screw 233 that is threaded into the adjustable die supporting block 42'.

The drive pulley 54' of the laterally shiftable lower belt 55' is splined on the shaft 53, (Fig. 16), and is shifted laterally in one direction by the vertical web of the angle iron 52' which is extended rearwardly and apertured for the passage of the drive shaft 53, and said pulley 54' is shifted in the opposite direction by a strip or plate 234 that is attached to the rear hub of the yoke bar 49' and is apertured or forked for the passage of the shaft 53 and lies opposite the flat side of the pulley 54'. The upper drive pulley 79' lies between a pair of rearwardly extending arms 235 and 236 formed on the yoke members 75' and 76', respectively, whereby as said yoke members are shifted by the screws 228 and 229, the drive pulley 79' of the upper belt 84' is simultaneously shifted laterally.

The operation of the machine has been quite fully indicated in connection with the foregoing description of its structural parts, but may be briefly outlined as follows:

While the machine is capable of breaking and folding the corners of any form or type of rectangular blank, in Figs. 17, 18 and 19 I have illustrated a typical form of blank and the shape into which it is bent and folded by the machine. In these views A designates the body of the blank, B the side walls thereof joined to the body by scored lines C, D the end walls joined to the body by scored lines E, and F the four corners joined to the side walls B by scored lines G and to the end walls D by scored lines H. The outer edges of the corners F are notched thereby forming tongues I, and the end walls D have extension flaps K connected thereto by scored lines L. The blanks are fed, flat and one end foremost in succession, into the nip of the conveyor belts, being timed by the automatic feed regulators 135 and 135'. As the forward edge of the blank approaches the front pair of dies, the hinged die walls 86, 86' swing upwardly to the position shown in Figs. 1, 2, 5 and 7, allowing the flap K to pass freely between the upper and lower die members. The frictional grip of that portion of the conveyor belts between the front and rear die members is sufficient to carry the blank onwardly but as soon as the forward edge of the foremost flap K strikes the stop fingers 154', the travel of the blank is arrested for an instant, while the lower die members rise and bend and fold the blank temporarily into substantially the shape shown in Fig. 18. In this operation, the oblique die blades 92 and 101 first break the corners F on the oblique lines M of Fig. 17, folding the two triangular halves of the corners inwardly in advance of the folding of the end and side walls, as indicated in Fig. 11, wherein the lower die member is shown as about half way through its working stroke. The instant the lower die members have retreated the stop fingers 154' also are retracted, and the cam 161, through the elbow levers 82 and rollers 83, pinches the two belt sections together on the top of the blank so that the latter is again carried forwardly out of the zone of action of the dies. The upwardly bent flap K strikes the rapidly traveling belts 167, 167' and by the latter is flattened down again, so that the blank is carried on through and out of the machine.

With further reference to the operation of the swinging die walls 86, it should be noted that as soon as the forward edge of the blank has passed the forward die members, the walls 86 are swung downwardly to vertical position by the cam 126 and held in such position during the forming operation; the cam permitting the said walls to swing upwardly again just before the next blank arrives beneath the latter.

The machine is adjusted to handle longer or shorter blanks by turning the hand wheel 190 in one direction or the other, this, through the pinions 191 and racks 192, shifting the carriage carrying the front die members and belt supporting and guide devices bodily toward or from the front or blank receiving end of the machine, and thus adjusting the space between the front and rear pairs of die members according to the length of the particular blanks to be run through the machine. The machine is adjusted to handle wider or narrower blanks by simply turning the hand wheel 197 in one direction or the other, which, through the turning of the several long screws, effects a bodily shift of the die members and belts and belt supporting devices on the left side of the machine toward or from the corresponding devices on the right side of the machine, thereby adjusting the space between the front and rear pairs of die members on the left side and the corresponding pairs on the right side according to the width of the particular blanks to be run through the machine. It will thus be seen that, of the four pairs of cooperating die members operating respectively upon the four corners of the blank, three of them are bodily shiftable, while only one is stationary for all sizes of blanks.

As above indicated, the chief function of this machine, in operating upon blanks of this character, is to break the corners F obliquely to create the corner folds indicated by F' in Fig. 18. The complete setting up of the box body from a blank of this form is effectuated later by bending the side and end walls upwardly and then folding the end flaps K inwardly and downwardly, and stitching them to the end walls D through the tongues I, but this operation may be performed either by hand or by a further mechanism receiving the corner-broken blanks directly from the present machine.

I am aware that machines for folding and bending cardboard box blanks of various forms have heretofore been known; but so far as I am aware my present machine is broadly new in the provision of die mechanism by which the corners of a blank connecting the side and end walls are obliquely broken, preliminary to being folded against the inner side of the end or side walls. Manifestly, the machine as herein shown and described may be variously modified in respect of details of structure and organization without involving any departure from the principle of operation, and without sacrificing any of the advantages of the invention. Hence, I have herein claimed such features and combinations as are believed to be new and original in broad terms, and I reserve all such variations and modifications as fall within the spirit and purview of the claims.

I claim:

1. In a blank folding machine of the character described, the combination with a frame, of die mechanism mounted thereon for breaking the corners of the blank, upper and lower belts for conveying the blank to and beyond the field of operation of said die mechanism, and means for arresting the travel of the blank while said die mechanism is operating thereon.

2. In a blank folding machine of the character described, the combination with a frame, of four pairs of relatively stationary and movable die members mounted thereon for breaking the corners of the blank, upper and lower belts between the contiguous laps of which the blank is carried between said die members, and means for arresting the travel of the blank while said die members are operating thereon.

3. In a blank folding machine of the character described, the combination with a frame, of four pairs of relatively stationary and movable die members mounted thereon for breaking the corners of the blank, upper and lower belts between the contiguous laps of which the blank is carried between said die members, the blank-engaging portions of said belts being offset on opposite sides of the path of travel of the blank in the regions occupied by said die members, and means for arresting the travel of the blank while said die members are operating thereon.

4. In a blank folding machine of the character described, the combination with a frame, of upper and lower belts between the contiguous laps of which the blank is carried through the machine, four pairs of die members for breaking the corners of the blank, each pair comprising an upper male die member located above the path of travel of the blank and a lower vertically reciprocating female die member located below the path of travel of the blank, means whereby the blank-engaging portions of said belt are laterally offset in the regions occupied by said die members to permit the latter to operate on the blank, and means for arresting the travel of the blank while said die members are operating thereon.

5. In a blank folding machine of the character described, the combination with blank conveying mechanism, of a die mechanism for breaking the corners of the blank, said die mechanism comprising upper stationary die members and lower vertically reciprocating die members between which upper and lower die members the blank is passed; said upper die members having walls that are movable upwardly to allow the blank to pass without interference to a position between said upper and lower die members.

6. In a blank folding machine of the character described, the combination with blank conveying mechanism, of a die mechanism for breaking the corners of the blank, said die mechanism comprising upper stationary die members and lower vertically reciprocating die members between which upper and lower die members the blank is passed; said upper die members having hinged front walls, and means for swinging the lower ends of said walls upwardly as the forward edge of the blank passes beneath them.

7. In a blank folding machine of the character described, the combination with blank conveying mechanism, of a die mechanism for breaking the corners of the blank, said die mechanism comprising upper stationary die members and lower vertically reciprocating die members between which upper and lower die members the blank is passed; said upper die members having hinged front walls, spring means for swinging the lower ends of said walls upwardly as the forward edge of the blank passes beneath them, and cam means for returning said walls to vertical position and holding them vertical during the operation of the dies on the blank.

8. In a die mechanism for operating on a box blank, the combination of a stationary die member having vertical walls at a right angle to each other, and a reciprocating die member having similarly disposed walls adapted to overlap the walls of said stationary member and an obliquely disposed upstanding die blade operating to bend a corner of the blank and simultaneously break the corner on an oblique line bisecting the latter.

9. In a die mechanism for operating on a box blank, the combination of a stationary die member having vertical walls at a right angle to each other, the adjacent edges of said walls being upwardly and outwardly inclined to form a V-shaped opening between them, and a reciprocating die member having an obliquely disposed upstanding die blade operating to break a corner of the blank obliquely and fold the same between the inclined edges of the walls of said stationary die member.

10. In a die mechanism for operating on a box blank, the combination of a stationary die member having vertical walls at a right angle to each other, the adjacent edges of said walls being upwardly and outwardly inclined to form a V-shaped opening between them, and a reciprocating die member having similarly disposed walls adapted to overlap the walls of said stationary member and an obliquely disposed upstanding die blade operating to break a corner of the blank obliquely and fold the same between the inclined edges of the walls of said stationary die member.

11. In a blank folding machine of the character described, the combination of die mechanism for breaking the corners of a blank, means for conveying the blanks into and through the field of operation of said die mechanism, and means for arresting the travel of the blank while it is operated upon by the die mechanism comprising a stop finger adapted to engage with the forward edge of the blank, and means for moving said stop finger into and out of the path of travel of the blank.

12. In a blank folding machine of the character described, the combination of die mechanism for breaking the corners of a blank, two laterally spaced pairs of endless belts between the contiguous laps of which the blanks are conveyed into and through the field of operation of said die mechanism, and means for arresting the travel of the blank while it is operated upon by the die mechanism comprising a pair of stop fingers laterally adjacent to said belts and adapted to engage with the forward edge of the blank, and means for moving said stop fingers into and out of the path of travel of the blank.

13. In a blank folding machine of the character described, the combination of die mechanism for breaking the corners of a blank, upper and lower endless belts between the contiguous laps of which the blanks are conveyed into the field of operation of said die mechanism, and means for automatically opening and closing the entrance passage between said belts whereby to regulate the periods of admission of successive blanks thereto.

14. In a blank folding machine of the character described, the combination of die mechanism for breaking the corners of a blank, upper and lower endless belts between the contiguous laps of which the blanks are conveyed into the field of operation of said die mechanism, a stop finger, and means for alternately shifting said stop finger into and out of the entrance passage between said belts whereby to regulate the periods of admission of successive blanks thereto.

15. In a blank folding machine of the character described, the combination of front and rear pairs of die members for breaking the corners of a blank, upper and lower conveyor belts for carrying the blanks into the field of operation of said die members, the blank-engaging laps of said belts being upwardly and downwardly offset in the vertical planes of said front and rear die members to permit the latter to operate on the blanks, mechanism for arresting the travel of each blank as it reaches a position to be operated upon, means for retracting said arresting mechanism after the blank has been operated upon, and means for pinching the portions of said belts between said front and rear die members on the blank whereby to carry the latter out of the field of operation of the die members.

16. In a blank folding machine of the character described, the combination of front and rear pairs of die members for breaking the corners of a blank, upper and lower conveyor belts for carrying the blanks onto the field of operation of said die members, the blank-engaging laps of said belts being upwardly and downwardly offset in the vertical planes of said front and rear die members to permit the latter to operate on the blanks, mechanism for arresting the travel of each blank as it reaches a position to be operated upon, means for retracting said arresting mechanism after the blank has been operated upon, a spring-pressed plate underlying the lower belt between said front and rear die member, a roller overlying the upper belt above said plate, and cam means for forcing said roller downwardly, whereby the belts are pinched on the blank to carry the latter out of the field of operation of the die members.

17. In a blank folding machine of the character described, the combination of front and rear pairs of die members for folding up the side and end walls and breaking the corners of a blank, upper and lower conveyor belts for carrying the blanks into the field of operation of said die members, the blank-engaging laps of said belts being upwardly and downwardly offset in the vertical planes of said front and rear die members to permit the latter to operate on the blanks, and means for throwing the upwardly bent forward end wall of the blank down into the nip of said conveyor belts beyond the rear die members.

18. In a blank folding machine of the character described, the combination of front and rear pairs of die members for folding up the side and end walls and breaking the corners of a blank, upper and lower conveyor belts for carrying the blanks into the field of operation of said die members, the blank-engaging laps of said belts being upwardly and downwardly offset in the vertical planes of said front and rear die members to permit the latter to operate on the blanks, and an auxiliary belt located beyond said die members and serving to engage and throw the upwardly bent forward end wall of the blank down into the nip of said conveyor belts beyond the rear die members.

19. In a blank folding machine of the character described, the combination of front and rear pairs of die members for folding up the side and end walls and breaking the corners of a blank, spaced pairs of upper and lower main conveyor belts for carrying the blanks into the field of operation of said die members, the blank-engaging laps of said belts being upwardly and downwardly offset in the vertical planes of said front and rear die members to permit the latter to operate on the blanks, and a pair of inclined rapidly driven auxiliary belts located beyond said die members and laterally opposite said main belts with their lower ends extending into the horizontal plane of the blank-engaging pairs of the latter, the lower laps of said auxiliary belts serving to engage and throw the upwardly bent forward end wall of the blank down into the nip of said main belts beyond the rear die members.

20. In a blank folding machine of the character described, the combination of a frame, a carriage slidably mounted on said frame, a pair of cooperating dies mounted directly on said frame and adapted to operate upon one end of a blank, a pair of cooperating dies mounted on said carriage and adapted to operate upon the other end of the blank, means for conveying blanks into the field of operation of said dies, and means for shifting said carriage lengthwise of said frame whereby to adapt said dies to handle blanks of different lengths.

21. In a blank folding machine of the character described, the combination of a frame, a carriage slidably mounted on said frame, a pair of cooperating dies mounted on said frame and adapted to operate upon one end of a blank, a pair of cooperating dies mounted on said carriage and adapted to operate on the other end of the blank, upper and lower belts mounted on said frame and carriage for conveying the blanks into the field of operation of said dies, and means for shifting said carriage lengthwise of said frame whereby to adapt said dies to handle blanks of different lengths.

22. In a blank folding machine of the character described, the combination of a frame, a carriage slidably mounted on said frame, two pairs of cooperating dies mounted on said frame and adapted to break the corners at one end of a blank, two pairs of cooperating dies mounted on said carriage and adapted to break the corners at the other end of the blank, spaced pairs of upper and lower belts mounted on said frame and carriage for conveying the blanks into the field of operation of said dies, and means for shifting said carriage lengthwise of said frame whereby to adapt said dies to handle blanks of different lengths.

23. In a blank folding machine of the character described, the combination of a frame, a carriage mounted on said frame and adjustable lengthwise thereof, two pairs of cooperating die members mounted directly on said frame and adapted to break the corners at one end of a blank, two pairs of cooperating die members mounted on said carriage and adapted to break the corners at the other end of the blank, means for conveying blanks into the field of operation of said dies, and means for bodily adjusting the front and rear pairs of die members on one side of the machine toward and from the corresponding die members on the other side of the machine, whereby said machine is adapted to handle blanks of different lengths and widths.

24. In a blank folding machine of the character described, the combination of a frame, a carriage mounted on said frame and adjustable lengthwise thereof, two pairs of cooperating die members mounted on said frame and adapted to break the corners at one end of a blank, two pairs of cooperating die members mounted on said carriage, and adapted to break the corners at the other end of the blank, laterally spaced pairs of upper and lower conveyor belts for the blanks guided and supported on said frame and carriage, and means for bodily adjusting the front and rear pairs of die members and the belts and their guiding and supporting devices on one side of the machine toward and from the corresponding parts on the other side of the machine, whereby said machine is adapted to handle blanks of different lengths and widths.

25. In a blank folding machine of the character described, the combination of a frame, a carriage mounted on said frame and adjustable lengthwise thereof, two pairs of cooperating die members mounted on said frame and adapted to break the corners at one end of a blank, two pairs of cooperating die members mounted on said carriage, and adapted to break the corners at the other end of the blank, laterally spaced pairs of upper and lower conveyor belts for the blanks guided and supported on said frame and carriage, and adjusting screws journaled in said frame and engaged with the dies and belt guiding and supporting devices on one side of the machine, whereby the latter may be shifted toward and from the corresponding parts on the other side of the machine, thereby adapting the latter to handle blanks of different lengths and widths.

26. In a blank folding machine of the character described, the combination of a frame, a carriage mounted on said frame and adjustable lengthwise thereof, two pairs of cooperating die members mounted on said frame and adapted to break the corners at one end of a blank, two pairs of cooperating die members mounted on said carriage, and adapted to break the corners at the other end of the blank, laterally spaced pairs of upper and lower conveyor belts for the blanks guided and supported on said frame and carriage, adjusting screws journaled in said frame and engaged with the dies and belt guiding and supporting devices on one side of the machine, a hand wheel and operating connections from said hand wheel to said screws for simultaneously actuating the latter whereby the dies and belt guiding and supporting devices on one side of the machine may be adjusted toward and from the corresponding parts on the other side of the machine, thereby adapting the latter to handle blanks of different lengths and widths.

CHAS. L. MOYER.